June 10, 1969  D. F. STEDMAN  3,449,135

RAIN REPELLENT COMPOSITION

Filed Oct. 22, 1965

INVENTOR
Donald F. Stedman

BY
James A. Lamb
PATENT AGENT

United States Patent Office 3,449,135
Patented June 10, 1969

3,449,135
RAIN REPELLENT COMPOSITION
Donald F. Stedman, Ottawa, Ontario, Canada, assignor to Canadian Patent and Development Limited, Ottawa, Ontario, Canada, a corporation of Canada
Filed Oct. 22, 1965, Ser. No. 500,732
Int. Cl. C09k 3/18; C03c 25/02
U.S. Cl. 106—2                                    16 Claims

ABSTRACT OF THE DISCLOSURE

A water repellent composition consisting of a polysilane mixed with an adhesion promoting agent. The adhesion promoting agent is a mixture of carbon black and highly amorphous ferric oxide, that is, ferric oxide with essentially no characteristic crystalline diffraction pattern. For related purpose, such as cleaning repellent films already formed, diatomaceous silica may be substituted, in whole or in part, for carbon black.

---

Figure 2:
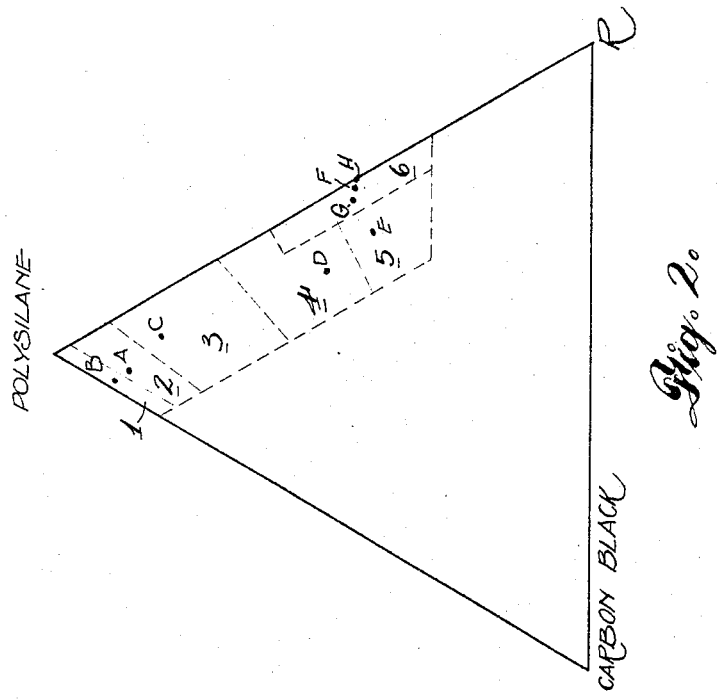

This invention relates to a water repellent composition for producing a water repellent film on the windshields of vehicles capable of rapid movement, or on other glass surfaces to make them waterproof or prevent them wetting with water.

In applicant's U.S. Patents 2,612,458, issued Sept. 30, 1952, 2,777,772 issued Jan. 15, 1957 and 2,923,633 issued Feb. 2, 1960 there are disclosed rain repellent compositions containing substituted polysilanes. The polysilanes disclosed in the two first-mentioned patents have at least one Si-Si linkage and contain in addition to the silicon only carbon and hydrogen in the form of alkyl groups. It is found however, that if some of the substitutent hydrocarbons are methyl groups the best results are not obtained. The substituted polysilanes disclosed in the last-mentioned Patent 2,923,633, have some of the alkyl groups replaced by alkoxy groups. Not more than half the alkyl groups are so replaced.

The substituted polysilanes are used as rain repellents by spreading a thin film over a windshield surface. As is disclosed in the above-noted patents the substituted polysilanes when used alone exhibit little or no adhesion to a glass or plastic surface of the windshield. It is necessary to add an adhesion promoting agent or friction agent to the polysilane and the mixture is rubbed as a film on the windshield. The use of the adhesion promoting agent, which is a finely divided powder, results in a substantial rain repellent film being built up on the windshield.

While the mechanism of this effect is a complex problem in surface chemistry, to which the applicant does not claim to provide herein a complete solution, it does appear that the adhesion promoting agent renders the molecules of the polysilane more reactable by means of the friction produced and also provides a freshly cleaned surface of the windshield to which the polysilane readily bonds.

Whatever the exact mechanism of this effect the applicant has shown in the above-noted patents that only some substances are effective as adhesion promoting agents. Specifically, it has been taught that carbon black is a useful adhesion promoting agent and that a mixture of carbon black and a fine powder, such as rouge, provides a superior adhesion promoting agent. In the above-noted Patent 2,777,772, it is taught that the powder used in mixture with carbon black may be a fine abrasive material such as silica, diatomaceous earth, cerium oxide or, preferably, rouge.

While the commercial rouge which has previously been used leads to good adhesion of the repellent film the use of such rouge has the disadvantage that scratches are formed in the repellent film. These scratches affect the useful life of the film by extending partly through to non-repellent glass and providing sections of the repellent area at which wear may start more easily. The water repellence and abrasion resistance of the film are also reduced. It has also proven difficult to use polysilane including methyl groups since the methyl groups accumulate on the glass in preference to any of the larger alkyl groups. That is to say, the presence of methyl groups in the polysilane gives extremely good adhesion properties. The methyl groups, however, do not contribute at all to the water repellence of a polysilane film and after a few applications the glass becomes inadequately repellent.

A further disadvantage in the use of such known water repellent films is that due to wear in use the scratched portions of the film break down rapidly to the underlying non-repellent glass while other areas of the film are still repellent. Under conditions of wear this gives a fine mesh of wet and dry spots through which vision is very difficult. The occurrence of this undesirable condition occurs only after the repellent film has been in use for some time but reduces the waterproofing unnecessarily and, if used to maintain vision through glass, makes it imperative that the film be maintained regularly.

It is therefore, an object of this invention to provide a water repellent composition which gives a repellent film not subject to this type of breakdown.

It is a further object of this invention to provide a water repellent composition containing a novel adhesion promoting agent.

It is a still further object of this invention to provide a novel composition adapted both to provide a water repellent film on glass and to function as a cleaning composition to activate the glass surface and remove dirt and undesirable surface films and deposits from the glass surface without damaging either the glass or any repellent or partially repellent film which may be thereon.

It is a still further object of this invention to provide a cleaning composition to remove dirt from rain repellent films without damaging the surface of such films.

The water repellent composition of this invention consists of a mixture of a substituted polysilane and adhesion promoting agent. The adhesion promoting agent is a mixture of carbon black and highly amorphous ferric oxide. This highly amorphous ferric oxide is produced by reacting ammonium oxalate with a soluble ferrous salt, preferably the sulphate, to produce a ferrous oxalate precipitate which is then washed and baked under carefully controlled conditions to ensure that its decomposition takes place at temperatures below the temperature at which crystalline ferric oxide is formed. The soluble ferrous salt is one which forms water soluble salts with the ammonium oxalate and leaves no metallic residue, salts such as the sulphate, nitrate and chloride are suitable. An essential feature of this process is that the ferrous oxalate is arranged in the form of a thin coherent film on a surface having a thermal mass large with respect to the film. This results in the temperature of the film being maintained below the temperature of crystalline formation despite the relatively large heat of decomposition of ferrous oxalate, which is of the order of 50,000 cals. per mol.

The phrase "highly amorphous powder" is used in this specification to denote a powder which, when subject to X-ray analysis, displays essentially no characteristic diffraction pattern, the "powder diagram" giving a strip of photographic film almost evenly blackened throughout, with only the slightest increase in intensity around locations indicating the α crystalline state, and with no tendency towards any other pattern or sharp lines at any point.

Figure 1:
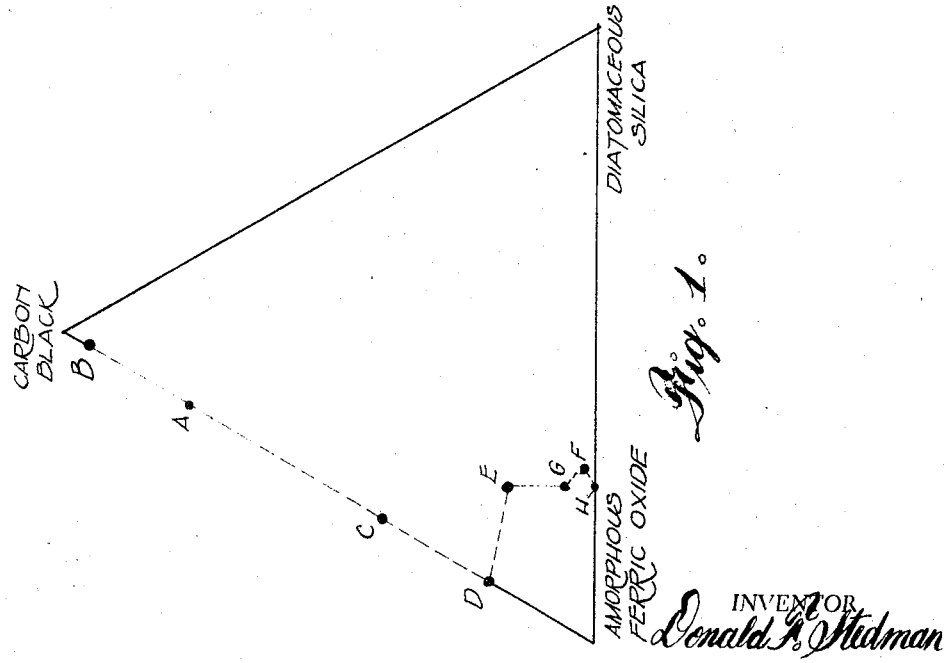

Further objects and features of this invention will become apparent from the specific compositions discussed below in conjunction with the accompanying drawing in which:

FIGURE 1 is a triangle diagram showing the relative proportions of the solid contents in the compositions, and FIGURE 2 is a triangle diagram showing the relative proportions of solid contents and polysilane in the compositions.

In the process for the preparation of the highly amorphous ferric oxide, ammonium oxalate solution is added to a ferrous sulphate solution and the ferrous oxalate precipitate is washed and by this invention thinly spread on a supporting surface to occupy at least 1.5 square centimeters of area per 1 g. of ferrous sulphate used and, preferably, 4 square centimeters per 1 g. of ferrous sulphate used.

The precipitate is then drained of any excess wash liquid, and placed in uncontaminated air in an oven at a temperature between 140° C. and 150° C. Care is taken that the precipitate remains in the form of a thin coherent film or cake. In particular bubble formation, which might disrupt such a film, is not permitted to occur.

The temperature of the oven is then raised at a rate preferably less than 1° C. per minute until the decomposition temperature of the ferrous oxalate is reached. The commencement of active decomposition of the ferrous oxalate is shown by a darkening in color of the precipitate. Different batches of even reagent grade chemicals yield precipitates having slightly different decomposition temperatures occurring the range 170° C. to 190° C. and slightly different colored products. Under no circumstances is the temperature of the ferrous oxalate raised above 195° C., this assures that the conditions for the formation of crystalline ferric oxide do not occur.

The resultant powder is highly amorphous ferris oxide having a very small particle size in the Angstrom region but displaying some agglomeration as a soft, fine, granular powder. It is so fine that, contrary to the property of known ferric oxides, it is quite hygroscopic, absorbing appreciable amounts of moisture from the air. The powder is useful as a polish and abrasion tests carried out using abrasive material with water on a cloth pad have demonstrated that to reproduce the abrasion caused by between 200 and 500 strokes of the pad when using commercial rouge some 7000 strokes of the pad are required when using the highly amorphous ferric oxide.

Contrary to the paramagnetic property of crystalline α ferric oxide, the highly amorphous ferric oxide is slightly ferromagnetic, although by chemical analysis it contains no ferrous oxide which could provide molecular orientation in the magnetite configuration, the totally random aggregation of the amorphous state presumably providing some molecular juxtapositions allowing a magnetic property. Since the powder is electrically insulating the magnetic property is useful even at high frequencies.

The process for producing highly amorphous ferric oxide and the resulting product are described more fully in applicant's copending U.S. patent application Ser. No. 494,946, entitled "Production of Amorphous Ferric Oxide," filed on Oct. 11, 1965.

A preferred form of adhesion promoting agent or friction agent for use in the water repellent composition of this invention is formed by mixing the amorphous ferric oxide powder with carbon black. The adhesion promoting agent is then mixed with a polysilane to form a water repellent composition. As discussed above the polysilanes by themselves do not adhere to glass and it is necessary to use a friction agent in conjunction with the polysilane to provide a repellent film.

The use of methyl groups in the polysilane is desirable to provide adhesion to the glass surface. The methyl groups, however, contribute very little to the repellence of the film and when used with previously known adhesion promoting agents tended to result in an undesirable accumulation of methyl groups on the glass. It has been found that polysilanes containing methyl groups may be used in the compositions of this invention without resulting in the undesirable accumulation of methyl groups on the glass. This result is achieved due to the amorphous ferric oxide providing a sufficient frictional effect to avoid methyl build-up and, at the same time, being sufficiently fine and uniform to avoid scratching. As a result, the very thin water repellent film retains its continuity and uniformity.

The polysilanes used in the compositions of this invention can be either η-alkyl polysilanes as disclosed in applicant's above-noted U.S. Patents 2,612,458 and 2,777,772 or a polysilane containing some alkoxy groups as disclosed in applicant's above-noted U.S. Patent 2,923,633.

The polysilanes preferred for use in the compositions of this invention and selected in accordance with the following requirements (1) The polysilane should contain two methyl groups. This is a compromise between a polysilane having one methyl group which would give less adhesion than is desirable and a polysilane having three methyl groups which would give less repellence than is desirable.

(2) The polysilane should contain no ethyl groups since these do not contribute substantially to either adhesion or repellence.

(3) There should be a total of 16, 18 or 20 carbon atoms per 2 silicon atoms.

(4) There should not be more than 2 amyl groups. These requirements stated above lead to the four types of polysilane listed in Table I as being the preferred polysilanes for use in the compositions of this invention. In this table the digits of the code number reading from the left to right indicate the number of methyl, ethyl, propyl, butyl and amyl groups respectively.

TABLE I

| Polysilane code number: | Carbon atoms |
| --- | --- |
| 2022 | 16 |
| 2004 | 18 |
| 20202 | 18 |
| 20022 | 20 |

Of these preferred 4 silanes code number 2004, dimethyl quadributyl, and code number 20202, dimethyl dipropyl diamyl give the best results when rated as windshield rain repellents.

If trisilanes or higher are to be included they are listed in the same alkyl group ratios per 2 silicon atoms. It is to be noted that the above table gives only even numbered isomers. In symmetrical polysilanes which break on friction, odd numbered isomers are identical in all respects with mixtures of the ±1, to even numbered isomers. For example polysilane 20301 is identical in results with an equal mixture of 20202 and 20400.

It is also to be noted that the definition of the polysilanes in their monomeric forms is simply for listing convenience. The polysilanes used in the compositions of this invention are in fact partly polymerised by the process of their synthesis. The complexities of the Grignard reactions producing more than monomeric forms, and of the silanes higher than the disilanes, noted in the above-identified patents of D. F. Stedman also relate to the present invention.

The following specific compositions are illustrative of the water repellent and cleaning compositions of this invention.

| Composition A: | Parts by weight |
| --- | --- |
| Polysilane | 650 |
| Amorphous ferric oxide | 25 |
| Carbon black | 75 |

This is the preferred composition for forming a water repellent film although variations within the range specified by compositions B and C below, produce very slight changes in the properties of the resultant repellent film.

| Composition B: | Parts by weight |
| --- | --- |
| Polysilane | 800 |
| Amorphous ferric oxide | 5 |
| Carbon black | 95 |

Composition C:
    Polysilane _____ 400
    Amorphous ferric oxide _____ 60
    Carbon black _____ 40

As the quantity of carbon black is reduced and the quantity of amorphous ferric oxide increased over the ratio specified by composition C the composition becomes less useful in forming a rain repellent film, but finds a new utility as a cleaning composition for rain repellent films already formed. It will be clear that a rain repellent film, once formed, will tend to be contaminated with dust from the atmosphere thereby obscuring vision. The use of any cleaning composition other than one closely related to the composition of the repellent film will tend to cause additional contamination.

While composition C is useful as a cleaning composition, related compositions which aid in the maintenance of the repellent film as well as cleaning it, are formed by increasing the ratio of amorphous ferric oxide to carbon black as composition D.

Composition D:                         Parts by weight
    Polysilane _____ 100
    Amorphous ferric oxide _____ 80
    Carbon black _____ 20

To improve the flow characteristic of the cleaning composition, a small quantity of a diatomaceous silica filler, such as is sold under the trade mark "Snowfloss," may be added. The proportion of diatomaceous silica is not critical but, since it is a diluent, a restricted quantity is used. Composition E is such a cleaning composition, sufficient polysilane being added to form a smooth paste.

Composition E:                         Parts by weight
    Polysilane _____ 100
    Amorphous ferric oxide _____ 80
    Carbon black _____ 20
    Diatomaceous silica _____ 20

To achieve cleaning of the repellent film formed on a surface it is possible to use a composition with only a trace of carbon black along with the amorphous ferric oxide. Some diatomaceous silica may be added to assist in the flow characteristic of the cleaner. Such cleaning compositions are detailed in compositions F and G with composition F being preferred.

Composition F:                         Parts by weight
    Polysilane _____ 120
    Amorphous ferric oxide _____ 71.1
    Diatomaceous silica _____ 26.7
    Carbon black _____ 2.2

Composition G:
    Polysilane _____ 100
    Amorphous ferric oxide _____ 72
    Diatomaceous silica _____ 23
    Carbon black _____ 5

It is also possible to use a cleaning composition which omits the carbon black and retains the amorphous ferric oxide. Such a cleaning composition is detailed in composition H. This composition is less desirable than compositions F and G in that there is a tendency for the components to separate. This composition produces a cleaning effect and no repellent effect.

Composition H:                         Parts by weight
    Polysilane _____ 100
    Amorphous ferric oxide _____ 80
    Diatomaceous silica _____ 20

A film formed on a windshield using the rain repellent composition of this invention has the advantage that the repellent film is uniform and free from scratched and thin areas. The wear of such a film due to continued exposure to weather conditions is therefore essentially uniform over the surface of the film and while there is a gradual deterioration of the film a breakdown of the windshield surface into a network of wet and dry spots does not occur.

Compared to previously known water repellent compositions the water repellent composition of this invention can be applied with less effort and builds up to a thicker more uniform film than that previously obtained. A few types of glass had previously required as many as 160 strokes along one line to produce a fully repellent surface while with the same glass and the rain repellent composition of this invention 15 strokes provided a fully repellent surface.

Referring now to FIGURE 1, there is shown a triangle diagram showing the proportions of the solid constituents in compositions A to H inclusive it being assumed that the polysilane is added in amounts needed to give a smooth soft paste. Except for composition H, all these compositions produce repellence on glass in some degree. There is a possibility in using composition B that some build up of methyl groups may occur on the glass. Between A and C little variation in properties is found but at D repellence is produced more slowly and cleaning is more marked. For really dirty surfaces it is found useful to add the coarser but soft diatomaceous silica as shown at E, while in steps designed to initiate repellence on dirty, previously non-repellent glass G or F are preferred. H will also function as a cleaner without contributing any repellent properties.

It may be said that the dotted line joining the points A, B, etc. to H is the locus of the most generally useful compositions and extends from the repellent film producing feature at one end (A, B and C) to the cleaning feature at the other end (E, F and G). Broadly stated, the carbon black activates the polysilane and thereby makes it adhesive to glass; the amorphous ferric oxide prevents the build-up of methyl groups on the glass and is of some assistance in cleaning the glass; and the diatomaceous silica both cleans the glass and activates it to a condition to which the activated polysilane readily attaches. It may be said that the three above-noted components all function as friction agents and the specific function of each towards producing water repellence on glass with polysilanes can be achieved by their use separately or in mixtures.

It may be useful in forming a repellent film on a glass surface to start with a composition containing most of the coarsest ingredients, such as F or G, then followed with an intermediate composition, such as D or E, and finally using the composition with the finest components, such as A B or C. By such a process the glass is first cleaned and activated thoroughly; a rough repellent surface is then formed on the outer molecular layers of the glass and finally a fine repellent film is formed. It is not, of course, necessary in every case to use the sequence of applying the three compositions. Using the proportions shown on the dotted locus conveniently overlaps these functions to produce a satisfactory result, many other proportions are, however, operative.

Referring now to FIGURE 2 there is shown a triangle diagram showing the useful ratio of liquid polysilane to be added to the solid components. The corner marked R shows the effective proportion of the rougher friction agents, diatomaceous silica and ferric oxide. Since four components would be very difficult to plot, these two components are combined as one factor being twice the silica content plus the ferric oxide (the oil absorption of the silica is about double that of the oxide).

The exemplary compositions A to H inclusive are identified in the triangle diagram of FIGURE 2 and general areas around these compositions, numbered 1 to 6 inclusive, are also shown. In area 6 the compositions are concerned almost entirely with cleaning (carbon black being marginal and added mainly to improve the texture of the pastes) with silica being a major constituent. Compositions in area 5 are also largely concerned with cleaning but repellence is also produced.

Silica may also usefully be included in the compositions of area 5.

In area 4 repellence is the major function and ferric oxide alone is adequate for maintaining the cleanliness of the glass. The compositions falling in areas 2 and 3 are mainly for use in perfecting a repellent surface and silica is therefore generally excluded. The compositions falling in area 1 may have too little ferric oxide to prevent a possible build-up of methyl groups on the glass and find their main utility when repellence is not required to be effective at high air speeds or when methyl groups are absent from the polysilane.

In tests performed on rain repellent films formed on a windshield surface by first using the cleaning composition F of this invention followed by the final repellent producing composition A excellent results have been obtained. In a simulated flight test at 700 m.p.h. with 30 grams of water per cubic meter of air the film was undamaged after 1½ hours of testing. The test was terminated because of build-up of dirt on the film. This is equivalent to a flight of 1000 miles through more than an intense cloudburst.

The compositions A to C of this invention may be used to waterproof glass or silicate surfaces other than windshields to give a high degree of transparency and water repellence. These compositions may also be used to waterproof, or to form a release agent on chromium metal or chromium stainless steels. In general, any surface having significant amounts of silicon or chromium may be treated with the water repellent compositions of this invention.

It is to be understood that variations may be made from the preferred embodiment of the invention herein described without departing from the spirit and scope of the invention which is defined in the appended claims.

I claim:

1. A composition for rendering silicon or chromium containing surfaces water repellent and cleaning such water repellent surfaces comprising,
   up to 800 parts by weight of a substituted polysilane having directly attached alkyl groups, each alkyl group having between 1 and 7 carbon atoms, and
   a mixture of between 5 parts and 80 parts by weight of highly amorphous ferric oxide showing no significant crystal structure by X-ray diffraction and equivalent to that produced by decomposing ferrous oxalate in the range 170°–190° C., together with sufficient friction agent to total 100 parts, said friction agent being selected from the group of carbon black and diatomaceous silica.

2. A composition for rendering silicon or chromium containing surfaces water repellent comprising,
   between 400 and 800 parts by weight of a substituted polysilane having directly attached alkyl groups, consisting only of silicon carbon and hydrogen, each alkyl group having between 1 and 7 carbon atoms, and
   100 parts by weight of an adhesion promoting agent consisting of a mixture of carbon black and highly amorphous ferric oxide showing no significant crystal structure by X-ray diffraction and equivalent to that produced by decomposing ferrous oxalate in the range 170°–190° C., there being between 5 parts and 60 parts by weight of ferric oxide and sufficient carbon black to total 100 parts by weight.

3. A composition for rendering silicon or chromium containing surfaces water repellent as claimed in claim 2 in which at least one of said directly attached alkyl groups is a methyl group.

4. A composition for rendering silicon or chromium containing surfaces water repellent comprising,
   650 parts by weight of a substituted polysilane having directly attached alkyl groups, each alkyl group having between 1 and 7 carbon atoms, and
   100 parts by weight of an adhesion promoting agent consisting of a mixture of 75 parts by weight of carbon black and 25 parts by weight of highly amorphous ferric oxide showing no significant crystal structure by X-ray diffraction and equivalent to that produced by decomposing ferrous oxalate in the range 170°–190° C.

5. A composition for rendering silicon or chromium containing surfaces water repellent as claimed in claim 4 in which at least one of said directly attached alkyl groups is a methyl group.

6. A composition for rendering silicon or chromium containing surfaces water repellent as claimed in claim 4 in which said polysilane has alkyl groups joined to silicon through oxygen forming alkoxy groups, said alkoxy groups being fewer in number than the directly attached alkyl groups.

7. A cleaning composition for use on silicon or chromium containing surfaces comprising,
   a mixture of diatomaceous silica and highly amorphous ferric oxide showing no significant crystal structure by X-ray diffraction and equivalent to that produced by decomposing ferrous oxalate in the range 170°–190° C., there being between 5 and 30 parts by weight of diatomaceous silica together with sufficient amorphous ferric oxide to total 100 parts, and sufficient substituted polysilane, up to 800 parts by weight, to form a smooth paste, said polysilane having directly attached alkyl groups, each alkyl group having between 1 and 7 carbon atoms.

8. A cleaning composition as defined in claim 7 comprising:
   80 parts by weight of highly amorphous ferric oxide,
   20 parts by weight of diatomaceous silica, and
   100 parts by weight of polysilane.

9. A cleaning composition as defined in claim 7 further comprising between 1 and 5 parts by weight of carbon black.

10. A cleaning composition as claimed in claim 9 comprising between 2 and 3 parts by weight of carbon black.

11. The improvement in the method of rendering silicon and chromium containing surfaces water repellent by applying thereto a film of up to 800 parts by weight of a substituted polysilane in which the majority of substituents are directly attached alkyl groups, each alkyl group having between 1 and 7 carbon atoms, and the remainder are alkoxy groups, which comprises applying the polysilane in admixture with 100 parts of an adhesion promoting agent consisting of between 20 and 95 parts of carbon black and between 5 to 80 parts of highly amorphous ferric oxide showing no significant crystal structure by X-ray diffraction and equivalent to that produced by decomposing ferrous oxalate in the range 170°–190° C.

12. The method as defined in claim 11 wherein said adhesion promoting agent consists of between 5 and 60 parts by weight of highly amorphous ferric oxide and sufficient carbon black to total 100 parts by weight and there are between 400 and 800 parts by weight of polysilane.

13. A method of cleaning and maintaining a water repellent film on a silicon or chromium containing surface which comprises applying thereto a mixture of between 100 and 200 parts by weight of a substituted polysilane in which the majority of substituents are directly attached alkyl groups, each alkyl group having between 1 and 7 carbon atoms, and the remainder are alkoxy groups, between 5 and 20 parts by weight of diatomaceous silica and 100 parts by weight of an adhesion promoting agent, said adhesion promoting agent consisting of a mixture of between 60 and 80 parts by weight of amorphous ferric oxide showing no significant crystal structure by X-ray diffraction and equivalent to that produced by decomposing ferrous oxalate in the range 170°–

190° C., and sufficient carbon black to total 100 parts by weight.

14. A method of cleaning a water repellent film on a silicon or chromium containing surface which comprises applying thereto a paste consisting of a mixture of diatomaceous silica and highly amorphous ferric oxide showing no significant crystal structure by X-ray diffraction and equivalent to that produced by decomposing ferrous oxalate in the range 170°–190° C., there being between 5 and 20 parts by weight of diatomaceous silica and sufficient amorphous ferric oxide to total 100 parts by weight, together with sufficient substituted polysilane, up to 800 parts by weight, to form a smooth paste, the majority of substituents in the polysilane being directly attached alkyl groups, each alkyl group having between 1 and 7 carbon atoms, and the remainder being alkoxy groups.

15. The method as claimed in claim 11 wherein the step of applying polysilane is the step of applying a polysilane stoichiometrically equivalent to a dimethyl quadributyl disilane.

16. The method as claimed in claim 11 wherein the step of applying polysilane is the step of applying a polysilane stoichiomtrically equivalent to a dimethyl dipropyl diamyl disilane.

References Cited

UNITED STATES PATENTS

| | | | |
|---|---|---|---|
| 2,612,458 | 9/1952 | Stedman | 106—13 XR |
| 2,777,772 | 1/1957 | Stedman | 106—13 |
| 2,923,633 | 2/1960 | Stedman | 106—13 |
| 3,071,479 | 1/1963 | Fulenwider | 106—287 XR |
| 3,197,319 | 7/1965 | Wright | 106—287 |

JULIUS FROME, *Primary Examiner.*

L. HAYES, *Assistant Examiner.*

U.S. Cl. X.R.

106—287; 117—123, 124, 135.1, 135.5